(12) United States Patent
Kuhn et al.

(10) Patent No.: US 10,947,743 B2
(45) Date of Patent: Mar. 16, 2021

(54) SYSTEM AND METHOD FOR APPLYING A TILE ADHESIVE

(71) Applicant: SIKA TECHNOLOGY AG, Baar (CH)

(72) Inventors: Patrik Kuhn, Zürich (CH); Raphael Bourquin, Neerach (CH); Didier Lootens, Küsnacht (CH); Luka Oblak, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/343,200

(22) PCT Filed: Dec. 5, 2017

(86) PCT No.: PCT/EP2017/081573
§ 371 (c)(1),
(2) Date: Apr. 18, 2019

(87) PCT Pub. No.: WO2018/104334
PCT Pub. Date: Jun. 14, 2018

(65) Prior Publication Data
US 2019/0242142 A1    Aug. 8, 2019

(30) Foreign Application Priority Data
Dec. 7, 2016    (EP) .................................... 16202750

(51) Int. Cl.
*E04F 21/02* (2006.01)
*B05C 5/02* (2006.01)
(Continued)

(52) U.S. Cl.
CPC .......... *E04F 21/023* (2013.01); *B05C 5/0216* (2013.01); *B05C 13/02* (2013.01);
(Continued)

(58) Field of Classification Search
CPC ..... E04F 21/1822; E04F 21/162; E04F 21/20; E04F 21/18; E04F 21/06; E04F 21/22;
(Continued)

(56) References Cited

U.S. PATENT DOCUMENTS 2,893,026 A * 7/1959 Sillars ................. B29C 66/1222
                                                                12/142 R
5,749,498 A * 5/1998 Lavoie .............. B05C 17/00516
                                                                222/192
(Continued)

FOREIGN PATENT DOCUMENTS

BE            101 5401 A3      3/2005
CA            3001811 A1 *     4/2018  ............... B05C 5/02
(Continued)

OTHER PUBLICATIONS

Feb. 21, 2018 International Search Report issued in International Patent Application No. PCT/EP2017/081573.
(Continued)

*Primary Examiner* — Beth A Stephan
(74) *Attorney, Agent, or Firm* — Oliff PLC

(57) ABSTRACT

A system for applying a tile adhesive, including: an adhesive supplying device for supplying the tile adhesive on a surface of a tile, including a nozzle for emerging the tile adhesive and a pump unit for pumping the tile adhesive in the direction of the nozzle; and an automated supporting and moving device, in particular robot, for supporting and positioning the tile with respect to the nozzle so that the tile adhesive is distributable onto the surface of the tile when emerging from the nozzle.

14 Claims, 4 Drawing Sheets

(51) Int. Cl.
*B05C 13/02* (2006.01)
*B25J 11/00* (2006.01)
*E04F 21/18* (2006.01)
*E04F 21/20* (2006.01)

(52) U.S. Cl.
CPC .............. *B25J 11/00* (2013.01); *B25J 11/005* (2013.01); *E04F 21/1822* (2013.01); *E04F 21/20* (2013.01)

(58) Field of Classification Search
CPC ........ B05C 5/0216; B05C 13/02; B25J 11/00; B25J 11/005
See application file for complete search history.

(56) References Cited

U.S. PATENT DOCUMENTS

| | | | | |
|---|---|---|---|---|
| 8,177,451 | B2* | 5/2012 | Park | A46B 3/04 |
| | | | | 401/193 |
| 8,985,402 | B2* | 3/2015 | Schneider | B65D 47/06 |
| | | | | 222/330 |
| 9,067,232 | B2* | 6/2015 | Gaardsoe | A47G 27/0487 |
| 10,370,862 | B1* | 8/2019 | Humann | B05C 5/004 |
| 10,526,799 | B2* | 1/2020 | Telleria | B05C 5/02 |
| 2005/0194401 | A1* | 9/2005 | Khoshnevis | B28B 1/001 |
| | | | | 222/100 |
| 2005/0257811 | A1* | 11/2005 | Axtell | B08B 1/02 |
| | | | | 134/34 |
| 2006/0118580 | A1* | 6/2006 | Spencer | B05C 17/00516 |
| | | | | 222/327 |
| 2006/0175432 | A1* | 8/2006 | Brock | B05B 12/085 |
| | | | | 239/298 |
| 2015/0283575 | A1* | 10/2015 | Miller | B05C 17/00516 |
| | | | | 239/548 |

FOREIGN PATENT DOCUMENTS

| | | |
|---|---|---|
| CN | 204955425 U | 1/2016 |
| DE | 20 2006 016 922 U1 | 3/2007 |
| EP | 1 598 502 A2 | 11/2005 |
| EP | 2 610 417 A1 | 7/2013 |
| EP | 2 907 938 A1 | 8/2015 |
| JP | H04-302660 A | 10/1992 |
| JP | 2004057995 A * | 2/2004 |
| KR | 2011 0009021 U | 9/2011 |
| WO | 99/56888 A1 | 11/1999 |

OTHER PUBLICATIONS

Feb. 21, 2018 Written Opinion of the International Searching Authority issued in International Patent Application No. PCT/EP2017/081573.

May 26, 2020 Written Opinion issued in Singapore Patent Application No. 11201902394T.

* cited by examiner

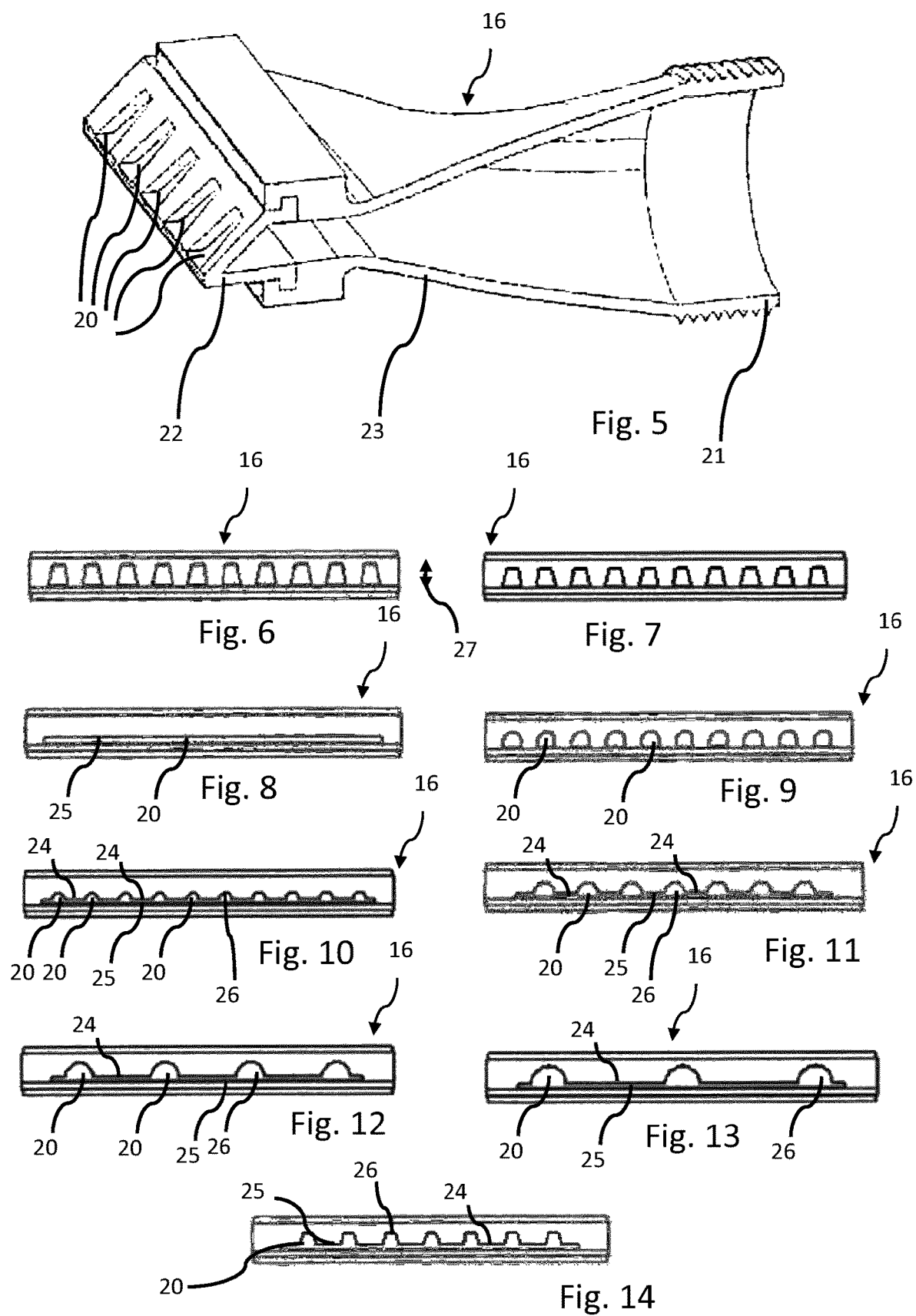

SYSTEM AND METHOD FOR APPLYING A TILE ADHESIVE

TECHNICAL FIELD

The present invention relates to a system for applying a tile adhesive and a method of applying a tile adhesive.

TECHNICAL BACKGROUND

It is known to apply tile adhesive either manually or via a screw pump and nozzle on the surface to be tiled. Usually, covering a floor or wall surface with ceramic tiles ("tiling") is performed manually by a specialised tiler (paver). Such tiling is a physically hard and time-consuming task which needs much expertise. If a tiling job is not performed correctly, uneven or irregular tile surfaces result which (in particular for aesthetic reasons) are often not acceptable and have to be repaired or fully replaced. Repairing or replacing a tiled surface is, again, very laborious, generates a lot of dust and is comparatively expensive.

WO 99/56888 A1 discloses a portable adhesive applicator apparatus for articles to which adhesive is to be applied, wherein the articles may be parquet panels, ceramic tiles and the like. It is generally mentioned that the adhesive may be applied directly to the underside of a parquet panel. A pusher means pushes the parquet panel under nozzles wherein an adhesive pump is activated when the parquet panel touches an activating means in the form of, e.g. a micro switch under the adhesive nozzles, so that the adhesive exits the nozzles whilst the pusher means pushes the parquet panel against an end switch.

EP 1 598 502 A2 discloses a tile coating apparatus for flooring. The apparatus has a self-supporting frame, preferably equipped with rollers for moving the same to a required flooring location, and assembled thereto it comprises the combination of an adhesive holding tank housing a dispenser rod arranged in the semi-cylindrical tank bottom, tile transfer means, tile stacking means and driving means. By means of a suitable transfer and guiding means another tile (of a stack) is transferred in a horizontal direction so as to pass underneath the coating dispensing unit filled with adhesive.

DE 20 2006 016 922 U1 discloses an application device with a nozzle assembly, wherein an adhesive material is applied on an adhesive side of a tile of similar plate. According to an embodiment, a mixing container, a nozzle, a conveyor belt, a tile transporting unit, and a motor unit are provided. In order to apply the adhesive material, the back side of a tile is arranged under a nozzle head rod, wherein the tile is transported by a conveyor belt.

BE 101 5401 A3 discloses an applicator including a system for applying one or more predetermined dosed amounts of bonding agent. The dosing system comprises a pump connected to one or more sealable hoses.

EP 2 610 417 A1 discloses a robot for delivering and spreading more adhesive material on a floor and another robot to pick up the tiles and accurately place them over an area treated with adhesive material.

In essence, there seems to be room for improvement with respect to reliability and speed of the known tiling methods.

SUMMARY

It is an object of the present invention to propose a system and a method for applying a tile adhesive which allows a reliable and fast tiling of a surface (e.g. of a wall or of the ground).

According to a first aspect of the present invention, a system for applying a tile adhesive is proposed, comprising an (automated) adhesive supplying device for supplying the tile adhesive (directly) on a surface of a tile, comprising a nozzle for emerging the tile adhesive and a pump unit for pumping the tile adhesive in the direction of the nozzle; and an automated supporting and moving device, in particular robot, for supporting and positioning (moving) the tile with respect to the nozzle so that the tile adhesive is distributable (directly) onto the surface of the tile when emerging from the nozzle.

A core idea of the invention is an automated supply of tile adhesive (mortar) on a surface (back side) of a tile, in particular via a robot. The adhesive may be placed on the surface (back side) of the tiles by an (extruding) nozzle. The adhesive may be mixed (mixable) with an accelerator at the nozzle to accelerate the process of setting. Thereby, a fast, homogenous and controlled application of the tile adhesive is possible. This improves the speed and quality of the tiling process and also reduces costs. In particular, in the construction of large tiling surfaces and precast systems, an improved system for applying a tile adhesive is obtained. The supporting and moving device can be configured so that the tile is moved during emergence of tile adhesive from the nozzle (wherein the nozzle may stand still). Alternatively (during emergence from the nozzle) the nozzle may be moved (wherein the tile may stand still). The robot may comprise one, two or more robot arms (which can be configured to move in any direction of the three-dimensional space). The automated supporting and moving device may contain a control device and/or a (electronic) memory device and/or determination (sensor) means for determination of a position of the tile with respect to the nozzle. The automated supporting and moving device is in particular configured so that the tile is supported and positioned with respect to the nozzle (during emergence of the tile adhesive from the nozzle) without any input from the outside (e.g. a person).

The nozzle comprises preferably a longitudinal slit and/or several apertures. The several apertures may be arranged in (exactly) one or more row(s). The several apertures may be connected with each other or disconnected from each other. In this regard, a connection of the aperture means preferably that the apertures form a common opening (wherein the several apertures are connected via connection apertures such as connection slits or the like). The several apertures may have a circular or elliptic or oval or another cross-section (wherein connection apertures can have a slit shape). The several apertures may be arranged in one, two, three, four or more rows. Preferably, there are at least two, or at least three or at least five apertures. It is also possible that (during emergence from the nozzle) both, tile and nozzle stand still (e.g. in a case, wherein the nozzle comprises several apertures which are arranged in a two-dimensional pattern such as a square or hexahedral pattern). The several apertures may be arranged in a matrix (e.g. in a square or hexahedral lattice). When several apertures are arranged in a (two-dimensional) matrix, the adhesive may be applied quicker on the tiles.

The pump unit may comprise an electric or hydraulic pump. In general, the pump unit may comprise a high pressure pumping device. Thereby, a constant (controllable) flow of the tile adhesive can be obtained.

The nozzle may comprise an active (dynamic) or passive (static) mixing device, e.g. for adding a setting compound (accelerator) to the adhesive. In particular, when a setting compound can be added, the tile adhesive can quickly set which reduces the necessary time until persons can work on the tiled floor. Common tile adhesives may well require 24 hours before persons can work on it. The overall time for tiling a surface can be significantly reduced. Alternatively, or in combination, the nozzle may comprise a heating device. Such a heating device may for example activate a setting compound (accelerator) in the tile adhesive.

The robot may include a robot arm and/or a supporting device comprising a linear moveable system being moveable in at least two, preferably at least three, optionally up to six, different axial directions.

Preferably, the system for applying a tile adhesive comprises a (preferably refillable) reservoir, further preferably cartridge and/or cylinder and/or barrel. Such reservoir may be part of the pump unit (e.g. forming an integral structure of, or together with, the pump unit). A reservoir such as a barrel reduces the cleaning effort and speeds up the process.

The system for applying a tile adhesive may comprise a funnel for receiving adhesive. Such funnel may be configured to fill a cylinder space of a piston element. Thereby, a simple and reliable supply with tile adhesive is accomplished.

Preferably, an adhesive supplying device is provided being configured for supplying adhesive (directly) on a surface (such as a ground, a wall or a panel) to be tiled. Such adhesive supplying device can be at least part of the adhesive supplying device which supplies the tile adhesive on a surface of the tile or can be a second adhesive supplying device e.g. comprising a second pump and/or a second nozzle. A double application on the floor and on the tile further improves a tiling process. In particular, time may be saved.

According to another aspect of the invention, a system for tiling a surface, in particular of a wall or the ground or a panel, is proposed, comprising a system for applying tile adhesive according to the above described kind, and an automated supporting and moving device, in particular robot, for positioning the tile onto the surface to be tiled. The automated supporting and moving device can be (at least in part) the automated supporting and moving device of the system for applying the tile adhesive. Alternatively, the system for tiling the surface may comprise a second automated supporting and moving device, in addition to the (first) automated supporting and moving device of the system for applying the tile adhesive.

Preferably, one and the same robot (in particular one and the same robot arm, respectively) may be configured as automated supporting and moving device for positioning the tile onto the surface to be tiled as well as for supporting and positioning the tile with respect to the nozzles so that the tile adhesive is distributable onto the surface of the tile when emerging from the nozzle. Thereby, a reliant and quick tiling of a surface (particularly of a wall or the ground or a panel) is achieved.

According to another aspect of the invention, a method of applying a tile adhesive, in particular under use of the system of the above-described kind, is proposed, comprising emerging the tile adhesive from a nozzle, wherein the tile is supported and moved with respect to the nozzle by an automated supporting and moving device, in particular a robot, so that the tile adhesive is distributed onto a surface of the tile (when emerging from the nozzle). At a time, when the tile adhesive is emerged from the nozzle, the tile may be moved (and the nozzle may stand still) or the nozzle may be moved (and the tile may stand still) or both, the tile and nozzle may be moved or both, the tile and the nozzle may stand still (in particular in a case, where the nozzle comprises a two-dimensional matrix of apertures). In any event, a fast and reliable appliance of tile adhesive is accomplished.

The method of applying a tile adhesive may further comprise mixing two components of a two- (or more-) component adhesive and/or adding a setting component to the adhesive, in particular by an active or passive mixing process.

Alternatively, or in addition, adhesive may be filled into a funnel.

The adhesive may be supplied (directly) on a surface (ground and/or wall and/or panel) to be tiled. In this case, a double application, on the surface and on the tile is proposed (optionally at the same time).

Preferably, the tile is moved when the tile adhesive emerges from the nozzle (in particular in a case, where the nozzle comprises only one aperture or only one row of apertures). Alternatively, the tile may not be moved (stand still) with respect to the nozzle when the tile adhesive emerges from the nozzle (in particular in a case where the nozzle comprises a two-dimensional pattern of apertures).

According to another aspect of the invention a method of tiling a surface is proposed, comprising the method of applying a tile adhesive as described above and positioning a plurality of tiles on a surface (e.g. ground and/or wall and/or panel) to be tiled.

Preferably, the step of applying the tile adhesive on the (respective) tile and positioning a plurality of tiles (with applied adhesive) on the surface is performed by one and the same robot (in particular one and the same robot arm). In embodiments, the tile does not move in relation to the (corresponding) automated supporting and moving device during applying a tile adhesive on the tile and/or during positioning the tile on the surface. In this regard, "no relative movement" means in particular no translational movement but may also exclude any rotational movement (between the tile and the corresponding automated supporting and moving device, in particular robot, preferably).

According to another (optionally independent) aspect of the invention, a use of a system for applying a tile adhesive as described above for applying a tile adhesive, is proposed. According to another (optionally independent) aspect of the invention, a use of a system for tiling a surface, as described above, for tiling a surface, is proposed.

The term "tile adhesive" comprises (e.g. cement-based) mortar or other materials for adhering tiles on a surface.

The system for applying a tile adhesive is able to apply the adhesive at comparatively high accuracy (with respect to quantity, geometry and/or location). In particular, the system for applying a tile adhesive may be computer-controlled (for full-automated operation). The adhesive supplying device may be linked to the (automated) supporting and moving device, in particular to the robot, in order to apply adhesive on the surface (back side) of a tile (which may then be positioned by the robot on the surface to be tiled). The adhesive supplying device and the automated supporting and moving device (robot) may be part of an automated tiling process allowing tiling a surface with high speed, high accuracy (quality) and low costs (since no humans must be involved in the application of the adhesive and, in particular, the placement of the tiles). The nozzle may extrude the adhesive in a fast and homogenous way and may form the extruded adhesive in a specific shape and diameter (as desired for the individual tiling task). The nozzle may comprise a mixing unit (mixer). The mixer can be a static or a dynamic mixer, optionally allowing to influence the reactivity (setting time) of an adhesive via the mixing parameters (mix intensity) and/or via the (optional) addition of chemicals (in particular accelerators). The pump unit can be used together with a (refillable) cylinder or with a cartridge or barrel (which may allow to speed up and atomize the recharging with adhesive and reduce the need for cleaning).

The tile adhesive may be applied on the surface in one or more coherent stream(s) (as e.g. in chocolate production) or may be sprayed on the surface.

BRIEF DESCRIPTION OF THE DRAWINGS

In the following, preferred embodiments of the present invention are described with reference to the drawings. These show:

FIG. 5 A cross-section of a nozzle according to an embodiment of the invention;

FIG. 6 A schematic front view of a further embodiment of the nozzle;

FIG. 7 A schematic front view of a further embodiment of the nozzle;

FIG. 8 A schematic front view of a further embodiment of the nozzle;

FIG. 9 A schematic front view of a further embodiment of the nozzle;

FIG. 10 A schematic front view of a further embodiment of the nozzle;

FIG. 11 A schematic front view of a further embodiment of the nozzle;

FIG. 12 A schematic front view of a further embodiment of the nozzle;

FIG. 13 A schematic front view of a further embodiment of the nozzle;

FIG. 14 A schematic front view of a further embodiment of the nozzle;

DETAILED DESCRIPTION OF THE EMBODIMENT

Figure 1:
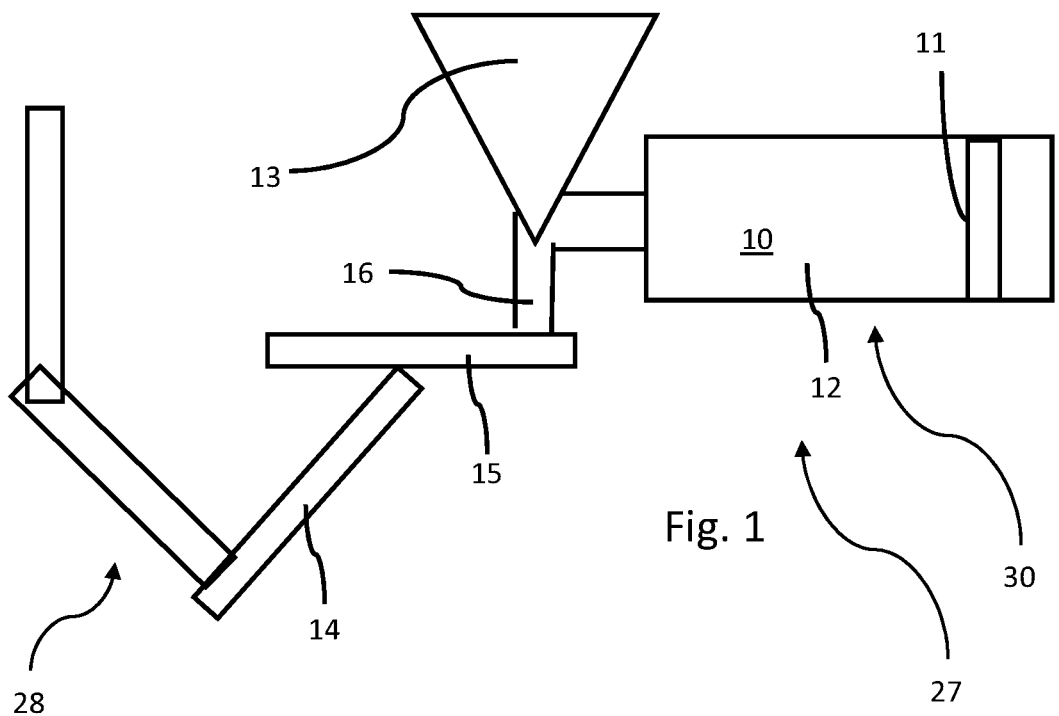
FIG. 1 A schematic illustration of a system according to the invention.

FIG. 1 shows a first embodiment of a system for applying a tile adhesive for tiling a surface. A tile adhesive 10 is pumped by a piston 11 in a cylinder 12 of a pumping unit 30 of an adhesive supplying device 27. The cylinder 12 may be refilled by a funnel 13. A robot arm 14 of an automated supporting and moving device (robot) 28 supports and moves a tile 15. The tile adhesive 10 is supplied via a nozzle 16 onto the tile. When the tile adhesive emerges from the nozzle 16, the robot arm 14 of the robot moves the tile 15 so that the tile adhesive is distributed on the tile 15 (in this case, the nozzle 16 may not move). After appliance of the tile adhesive 10, the robot arm 14 (or another robot arm, optionally of another robot) may position the tile 15 on the surface (ground and/or wall and/or panel) to be tiled.

Figure 2:
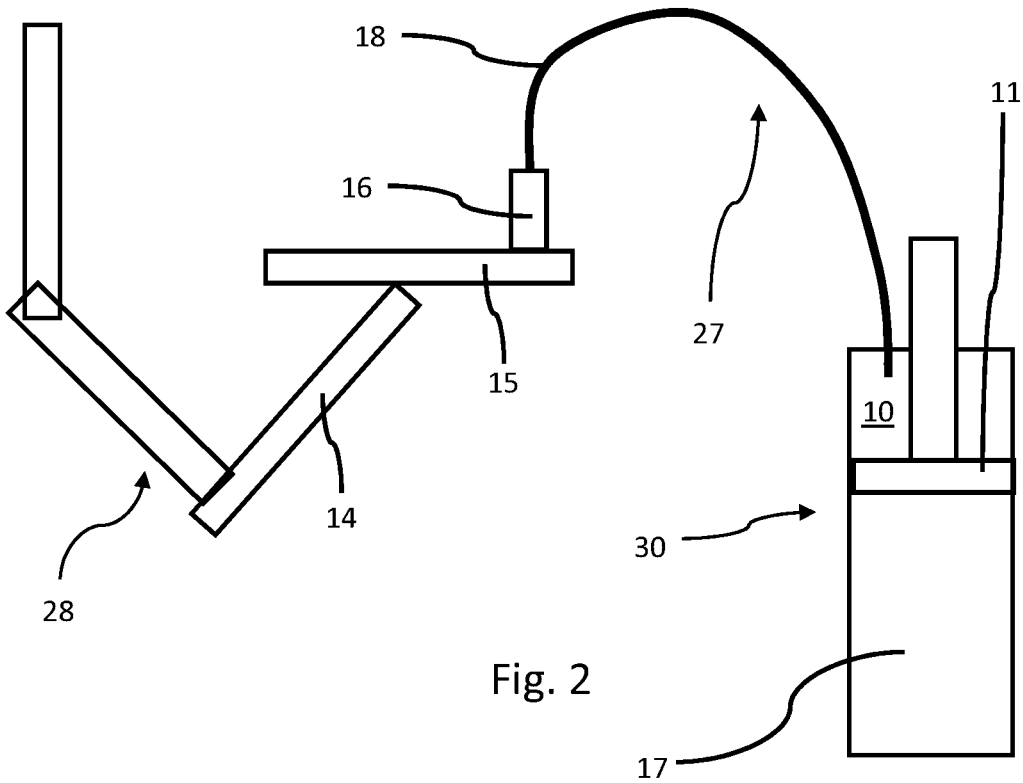
FIG. 2 A schematic illustration of a second embodiment of the invention.

FIG. 2 shows a schematic illustration of a second embodiment of the invention. Only the differences to the embodiment of FIG. 1 are described. In contrast to the embodiment of FIG. 1, the tile adhesive 10 is (directly) pumped from a barrel 17. The pumped tile adhesive 10 may be supplied via a supply line 18 to the nozzle 16. The solution of FIG. 2 reduces the cleaning effort and speeds up the process.

Figure 3:
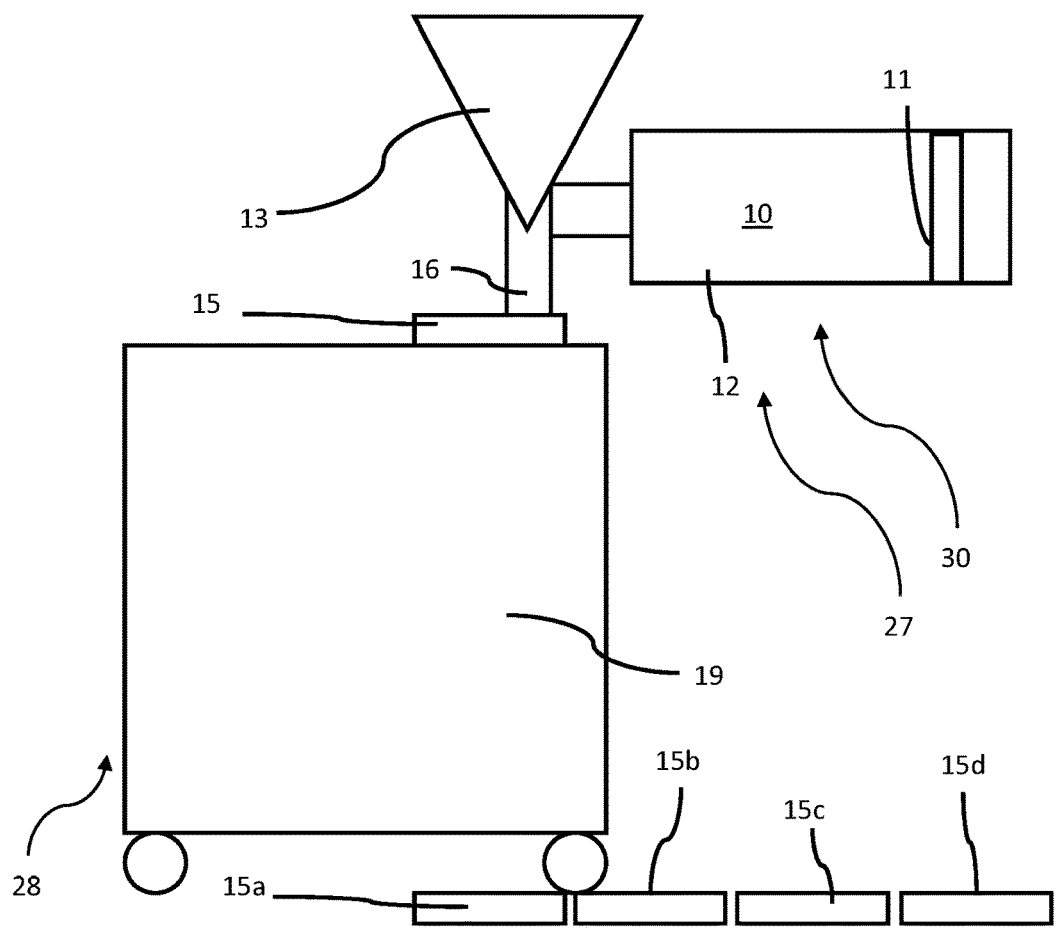
FIG. 3 A schematic illustration of a third embodiment of the invention.
Figure 4:
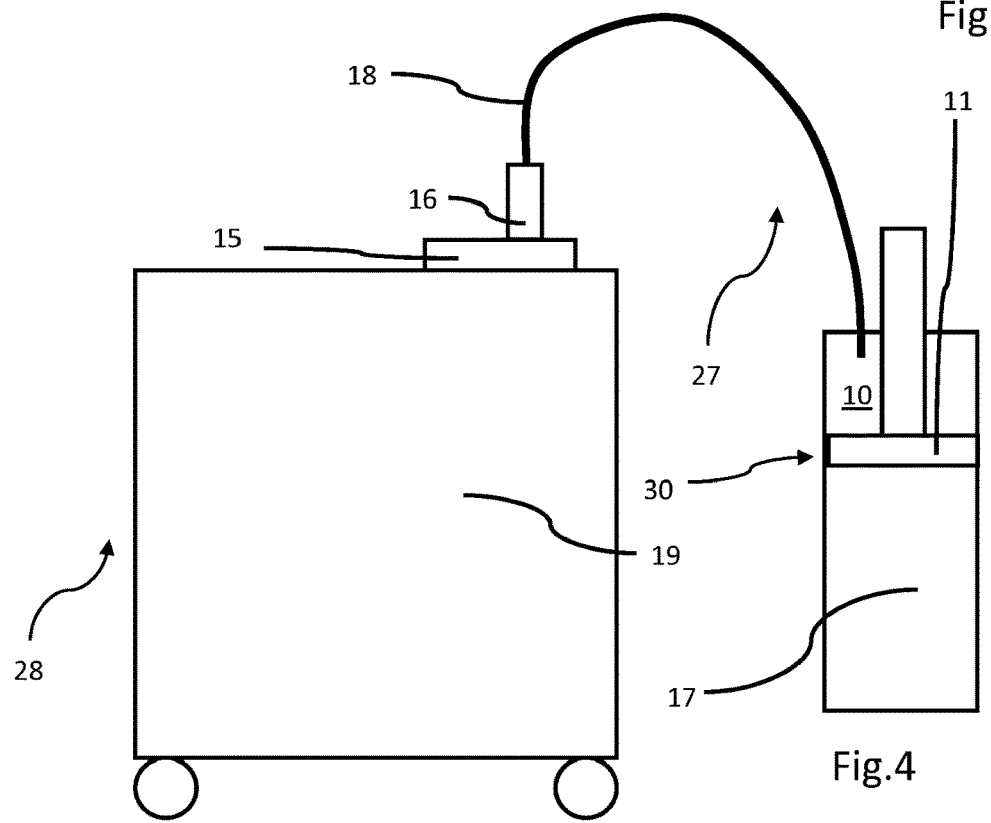
FIG. 4 A schematic illustration of a fourth embodiment of the invention.

In FIGS. 1 and 2, the tile 15 is held by a robot arm. Instead of the robot arm, according to FIGS. 3 and 4, a linear moving device 19 can be provided (apart therefrom, the embodiment of FIG. 3 may be identical to the embodiment of FIG. 1 and the embodiment of FIG. 4 may be identical to the embodiment of FIG. 2). The linear moving device 19 may be configured to move the tile 15 in at least three (up to six) different axes. The linear moving device 19 can be configured to move the tiles 15 to the surface to be tiled (e.g. ground and/or wall and/or panel) which is indicated in FIG. 3 by tiles 15a, 15b, 15c and 15d. In this case, tiles 15a to 15d may be part of a tiling of the ground. Further tiles (not shown in FIG. 3) may be arranged along a direction perpendicular to the plane of the drawing (e.g. in a square or hexahedral pattern.

FIG. 5 shows an embodiment of the nozzle 16. The nozzle 16 comprises a plurality of apertures 20. The apertures 20 of FIG. 5 are arranged in (one) row (in a one-dimensional arrangement). Via a fastening structure 21 (thread), the nozzle 16 can be fastened to a supply means (not shown in FIG. 5). The apertures 20 may be formed by an end piece 22 which can be connected to a main body 23 of the nozzle 16. This means, main body 23 and end piece 22 may form two different pieces (which are connectable with each other).

FIG. 6 shows another embodiment of the nozzle 16 in a front view. The embodiment of FIG. 6 is similar to the embodiment of FIG. 5 and comprises several (e.g. ten) apertures 20. As can be seen in FIG. 7, showing another embodiment of the nozzle 16, the dimension of the apertures 20 can be different (in this case, in comparison with FIG. 6, smaller).

FIG. 8 shows an embodiment of the nozzle 16 with (only) one aperture 20 formed by a slit. FIG. 9, shows another embodiment of the nozzle 16 comprising again a plurality of apertures with a different shape (in comparison with FIGS. 6 and 7).

FIG. 10 shows an embodiment of the nozzle 16, where the apertures 20 are interconnected by connection apertures 24 (which are smaller or thinner, respectively, or narrower, with respect to the apertures 20). FIG. 11 shows that the apertures 20 can be of a different number (in this case seven apertures). Apart therefrom, the geometry of the apertures 20 is similar to FIG. 10 (at least approximately semi-circles) and connection apertures 24 are provided. FIGS. 12 and 13, again show an embodiment of the nozzle with different (reduced) number of apertures 20 (in the case of FIG. 12, four; in the case of FIG. 13, three).

FIG. 14 shows an embodiment similar to FIGS. 6 and 7. However, in contrast to FIGS. 6 and 7, the number of apertures 20 is different and connection apertures 24 are provided connecting the apertures 20.

The structure with apertures 20 and connection apertures 24 (as for example shown in FIGS. 10, 11, 12, 13 and 14) may also be described as comprising a slit portion 25 (see for example, FIG. 13) with recesses 26 (forming the apertures 20).

In general, the length of the row of apertures 20 and/or the length of the (only) aperture 20 provided may be twice, preferably three times, further preferably five times, even further preferably eight times as large as the width of the aperture 20 or one of the apertures 20 (in FIG. 6 the width is indicated by arrow 27). Alternatively to the solutions according to FIGS. 6 to 14 (showing one row of apertures) the nozzle 16 may comprise several rows of apertures 20 (for example, at least a second or at least a third row which may be arranged in the width direction according to arrow 27 of FIG. 6, e.g. in a square pattern or hexahedral pattern).

According to the embodiments, the tile adhesive is pumped, extruded through the nozzle 16 and (directly) applied on a surface of a tile 15. The robot (comprising a robot arm 14 according to FIG. 1 or the moving device 19 of FIG. 2 or 4) preferably moves the tile 15 in two dimensions to allow an even application of the adhesive on the (full) surface of the tile. The nozzle 16 may be 3D printed to allow a complex shape. According to FIGS. 1 and 4, a (linear moving) piston is combined with a one-dimensional-configured nozzle for the application of the adhesive on the tile 15. A double application, on the surface to be tiled (e.g. floor and/or wall and/or panel) and on the tile may be performed. In this case, either one or two (different) pumps may be used to optimise the application time and the set-up.

Figure 15:
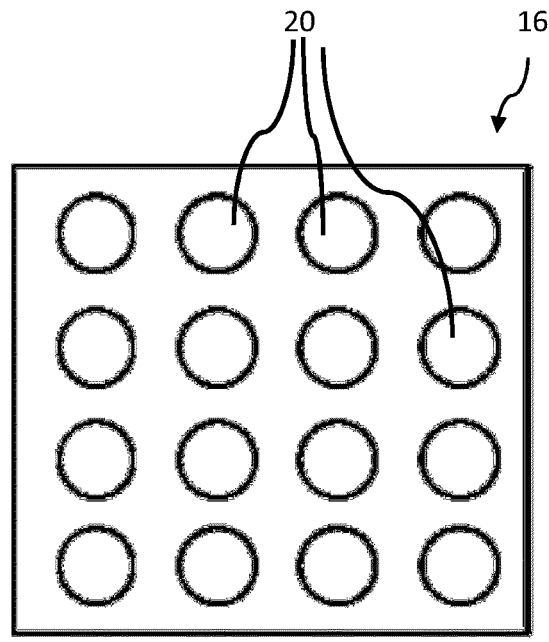
FIG. 15 A schematic front view of a further embodiment of the nozzle.
Figure 16:
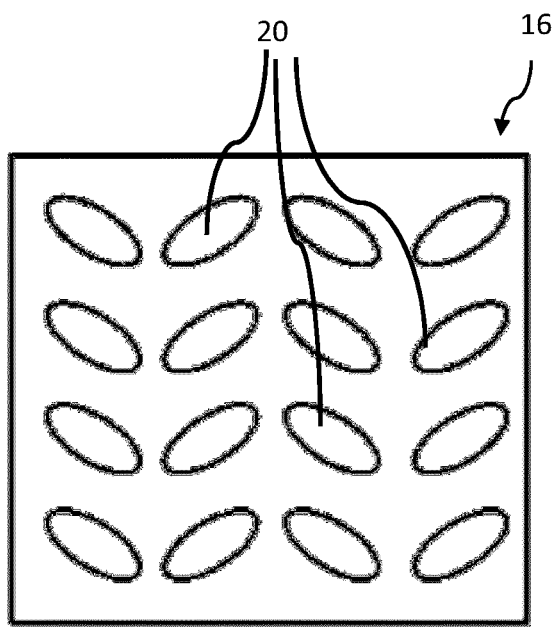
FIG. 16 A schematic front view of a further embodiment of the nozzle.

A two-dimensional-configured nozzle permits optionally a faster application of the adhesive on the tiles. Examples for two-dimensional-configured nozzles are shown in FIGS. 15 and 16. FIG. 15 shows a square lattice (in four rows and fours columns) of cylindrical apertures 20. FIG. 15 shows a square lattice (in four rows and fours columns) of elliptical apertures 20. The main axis of the elliptical structures are preferably inclined with respect to a direction defined by each respective row and/or inclined with respect to a direction defined by each respective column. Such inclined angle may be between 20° and 70°. The elliptical structures may be oriented in different (in particular mirroring) directions. The two-dimensional-configured design of the nozzle may accelerate the application as the adhesive could be directly applied on the tile with less (or even no, in particular if the nozzle is, at least approximately, of the size of the tile) displacement of a robot.

REFERENCE SIGNS

10 Tile adhesive
11 Piston
12 Cylinder
13 Funnel
14 Robot arm
15 Tile
16 Nozzle
17 Barrel
18 Supply line
19 Linear moving device
20 Aperture
21 Thread
22 End piece
23 Main body
24 Connection aperture
25 Slit portion
26 Recess
27 an adhesive supplying device
28 automated supporting and moving device (robot)
30 Pump (unit)

The invention claimed is:

1. A system for applying a tile adhesive and tiling a surface, the system comprising:
   an adhesive supplying device for supplying the tile adhesive on a surface of a tile, the adhesive supplying device comprising:
      a nozzle having a longitudinal slit or several apertures and configured to direct the tile adhesive to emerge from the longitudinal slit or the several apertures, the nozzle including an active or passive mixing device that mixes an accelerator with the tile adhesive at the nozzle; and
      a pump configured to pump the tile adhesive in a direction of the nozzle; and
   a robot arm configured to (i) support and position the tile with respect to the nozzle so that the tile adhesive is distributable onto the surface of the tile when emerging from the nozzle and (ii) position the tile onto the surface to be tiled.

2. The system of claim 1, wherein the pump comprises an electric or hydraulic pump.

3. The system of claim 1, wherein the pump includes at least one refillable reservoir.

4. The system of claim 1, further comprising at least one funnel for receiving the tile adhesive.

5. The system of claim 1, wherein the adhesive supplying device or a second adhesive supplying device is configured for supplying the tile adhesive on the surface to be tiled.

6. A method of applying the tile adhesive, with the system of claim 1, comprising:
   causing the tile adhesive to emerge from the nozzle, wherein the tile is supported and moved with respect to the nozzle by the robot arm so that the tile adhesive is distributed onto the surface of the tile.

7. The method of claim 6, further comprising using two components of a two-component adhesive or adding a setting component to the tile adhesive, or filling the tile adhesive into a funnel.

8. The method of claim 6, further comprising supplying the tile adhesive on the surface to be tiled.

9. The method of claim 6, wherein the tile is moved when the tile adhesive emerges from the nozzle.

10. The method of claim 6, wherein the tile is not moved with respect to the nozzle when the tile adhesive emerges from the nozzle.

11. A method of tiling a surface, comprising the method of claim 6, and further comprising positioning a plurality of tiles on the surface to be tiled.

12. The system of claim 1, wherein the robot arm comprises a sensor configured to determine a position of the tile with respect to the nozzle.

13. The system of claim 1, wherein the nozzle includes a heating device for heating the tile adhesive.

14. A system for applying a tile adhesive and tiling a surface, the system comprising:
   an adhesive supplying device for supplying the tile adhesive on a surface of a tile, the adhesive supplying device comprising:
      a nozzle having a longitudinal slit or several apertures and configured to direct the tile adhesive to emerge from the longitudinal slit or the several apertures, the nozzle including an active or passive mixing device that mixes an accelerator with the tile adhesive at the nozzle; and
      a pump configured to pump the tile adhesive in a direction of the nozzle; and
   a movable cart configured to (i) support and position the tile with respect to the nozzle so that the tile adhesive is distributable onto the surface of the tile when emerging from the nozzle and (ii) position the tile onto the surface to be tiled.

\* \* \* \* \*